INVENTORS
HANS O. SCHJOLIN
DONALD K. ISBELL
BY
THEIR ATTORNEY

INVENTORS
HANS O. SCHJOLIN
DONALD K. ISBELL
BY
THEIR ATTORNEY

INVENTORS
HANS O. SCHJOLIN
DONALD K. ISBELL
BY

THEIR ATTORNEY

# United States Patent Office 2,920,722
Patented Jan. 12, 1960

2,920,722

BRAKE-ADJUSTING DEVICE

Hans O. Schjolin, Birmingham, and Donald K. Isbell, Pontiac, Mich., assignors to General Motors Corporation, Detroit, Mich., a corporation of Delaware Application February 12, 1958, Serial No. 714,775

5 Claims. (Cl. 188—72)

This invention relates to a brake, and more specifically to a brake-adjusting device for a vehicle disk brake.

In the conventional disk-type brake in which a stack of frictionally-engaging disks are compressed axially, it becomes necessary to have a fine adjustment for clearance between the engaging disks. It is also desirable that this adjustment be made easily with the minimum amount of equipment. After the adjustment is made, it is necessary that the brake disks be sealed to keep out all foreign material and dirt as well as to have a locking device to prevent the brake from later being maladjusted.

It is an object of this invention to provide a device, when in operation, for adjusting a vehicle brake as the wheel is rotated.

It is another object of this invention to provide for the use of a minimum number of tools such as a small conventional wrench or screw driver in making this adjustment.

It is a further object of this invention to provide a brake-adjusting device which provides an accurate adjustment and a device which is easily accessible in making this adjustment.

It is a further object of this invention to provide a tight seal in the adjusting device as well as a locking means on the brake to avoid later maladjustment.

These objects are accomplished in a brake-adjusting mechanism which comprises a screw-threaded member carried in the brake housing which rotates with the wheel. This screw-threaded member can be projected into the brake housing for engagement with the end thrust plate in the brake assembly. The thrust plate is threadedly mounted on a stationary member which is carried by the axle housing. When this screw-threaded member is projected into engagement with the end thrust member, the end thrust member is rotated with the wheel until the disk stack is drawn tight. Thereafter the wheel may be rotated backward to give the desired clearance between the brake disks. After the adjustment is made, the screw member is then retracted from engagement with the end thrust plate to its original position. A suitable detent is provided in the end thrust member to lock the end thrust member in its adjusted position. A seal is also placed on the threaded member in the brake housing.

Further objects and advantages of the present invention will be apparent from the following description, reference being had to the accompanying drawings wherein preferred embodiments of the present invention are clearly shown.

Figure 1:
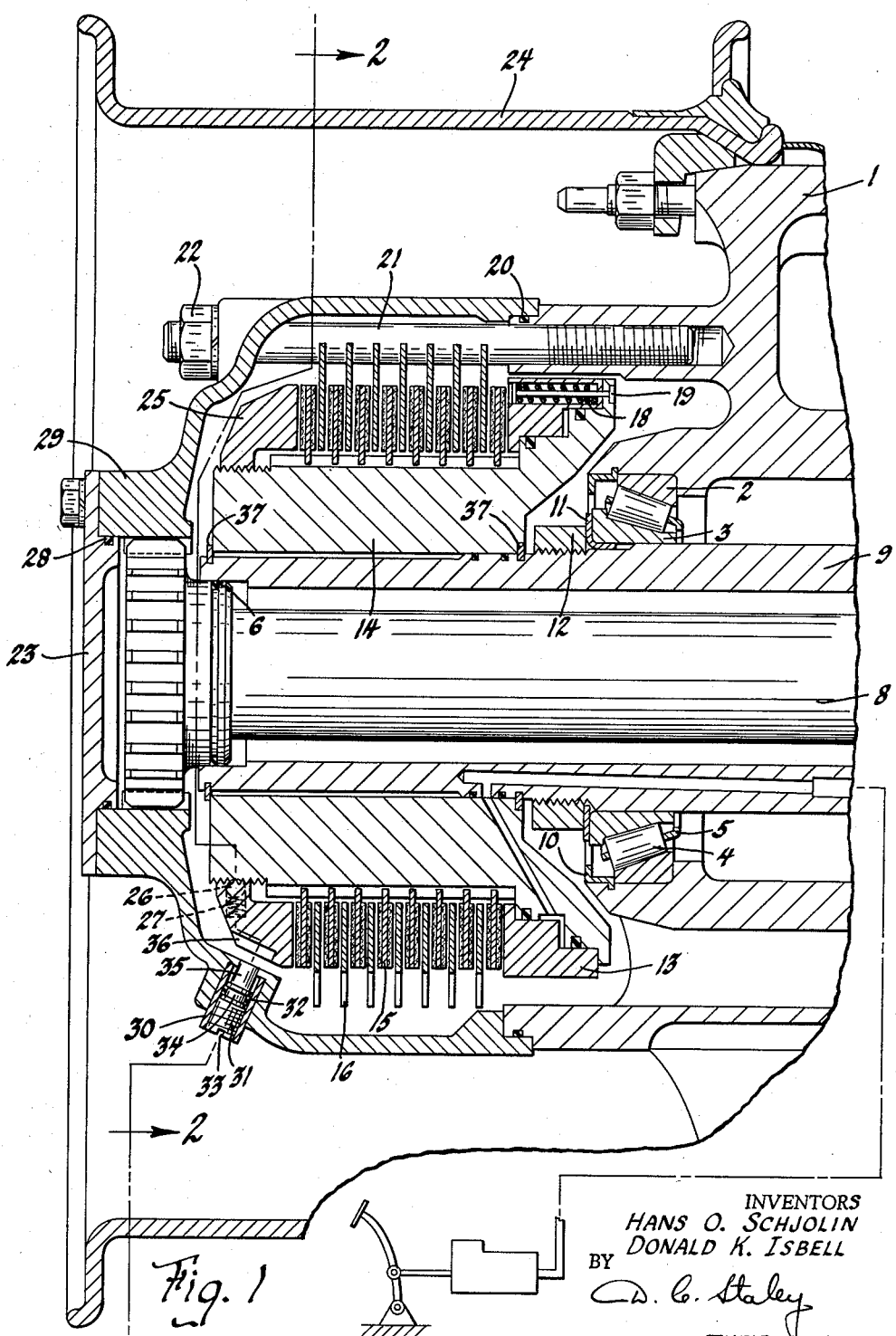
Fig. 1 is a cross-section view of the brake assembly viewed from an angle perpendicular to the center line of the main wheel shaft.
Figure 2:
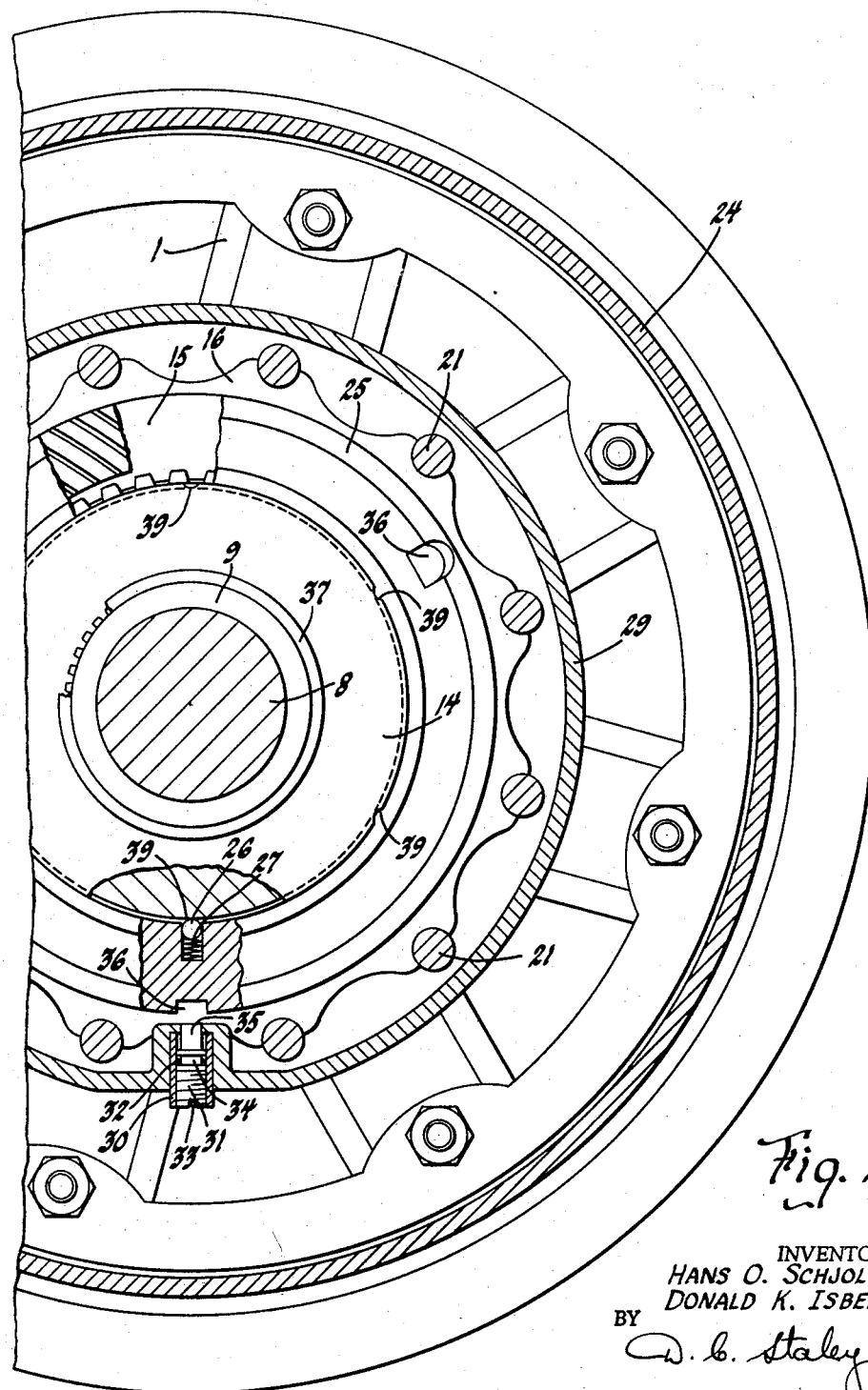
Fig. 2 is a cross-section view of the brake assembly viewed parallel with the center line of the main wheel shaft and taken along the line 2—2 of Fig. 1.
Figure 3:
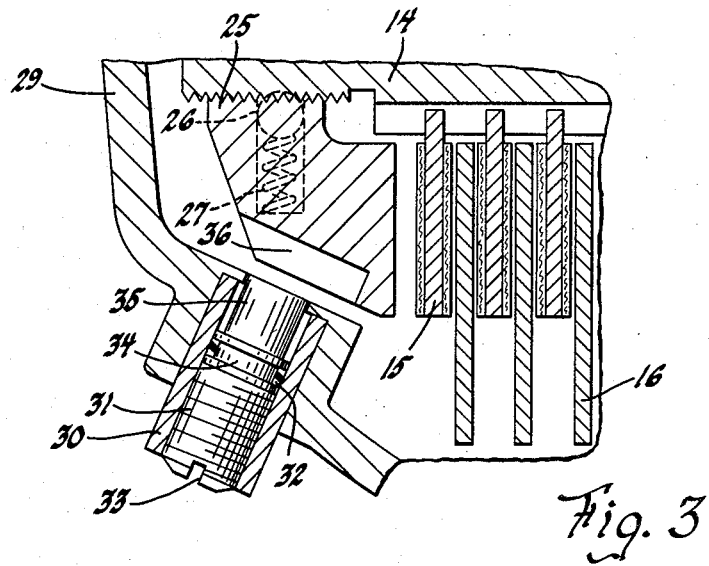
Fig. 3 is a cross-section view of the brake-adjusting mechanism which also shows the detent in the end thrust plate. This view shows the device before adjusting the brake.
Figure 4:
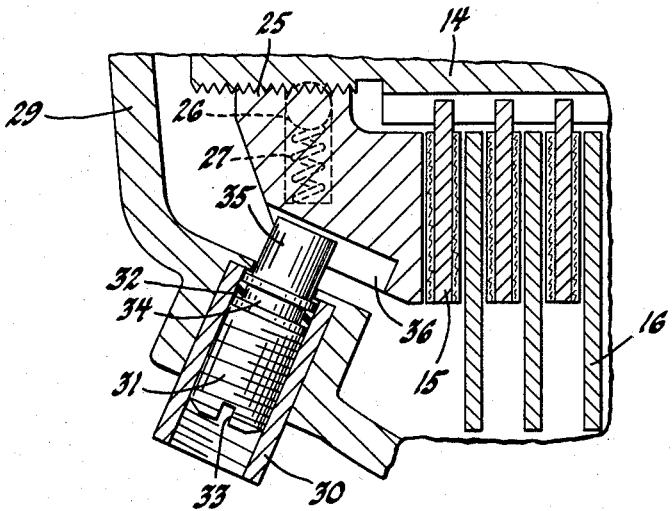
Fig. 4 is a similar view to Fig. 3 but shows the adjusting device in position to rotate the end thrust plate.

Fig. 1 shows the wheel and bearing assembly, a brake assembly and the adjusting device. The drive shaft is shown at 8 which is enclosed by a shaft housing 9. A bearing assembly is shown comprising an outer race 2, an inner race 3, a rolling element 4 and a cage 5. This bearing assembly is mounted on the outer periphery of shaft housing 9. A wheel 1 is mounted on the outer periphery of the bearing assembly. One or two rims 24 may be mounted on the outer periphery of said wheel 1. A seal 6 is provided on the inner periphery of the shaft housing 9 and the outer periphery of shaft 8.

A retainer ring 10 is placed on the inner periphery of the hub section of wheel 1 to lock the bearing assembly in position. A seating ring 11 is also placed on the outer periphery of the shaft housing adjacent the bearing assembly. A bearing-adjusting member 12 is placed just outboard of the seating ring 11 to provide the proper bearing adjustment of said bearing assembly.

A stator disk mounting member 14 is mounted outboard of said bearing assembly on the outer periphery of the shaft housing 9. Two snap rings 37 retain the stator disk mounting member 14 in its axial position. Stator brake disks 15 are mounted on the stator disk mounting member 14 by means of a spline connection. Rotating disks 16 are mounted for frictional engagement with said stator disks 15. An annular pressure plate 13 is mounted on a stator disk mounting member 14 inboard of the disk stack. This annular pressure plate is adapted for axial movement to frictionally engage the disks 15 and 16. A release spring 18 is mounted within said annular pressure plate 13, and on a pin 19 which is fastened on the inboard end of the pressure plate 13. An end thrust plate 25 is threadedly mounted on the outboard end of the stator disk mounting member 14 to provide a backing for the disk stack. This end thrust plate carries a spring detent comprising of a ball 26 and a spring 27. The ball 26 is mounted for radial movement within the end thrust plate 25. A groove 39 is also provided on the outer periphery of the stator member 14 for the ball 26 of the spring detent.

A brake housing 29 is spline-connected to the outboard end of shaft 8 for rotation with said shaft. This housing 29 is connected to wheel 1 by means of stud bolts 21 and nuts 22. The housing assembly comprising the housing 29 and stud bolts 21 and nuts 22 serves as a means for mounting the rotating brake disks 16. A seal 20 is provided on the inboard end on the inner periphery of said housing 29. An end plate 23 is provided on the outboard end of brake housing 29. A seal 28 is also mounted within the inner periphery of the outboard end of the brake housing and the outer periphery of the end plate 23.

An adjustable device is mounted in the housing 29 with means for projecting a member inwardly in said housing. This member is mounted in a sleeve 30 which is held in the housing 29. A threaded member 31 is mounted within this sleeve and engages a threaded portion within said sleeve 30. This threaded member 31 is provided with a means for rotation such as a screw drive slot 33. A groove portion 34 of the inner portion of said threaded member 31 is provided to receive a seal 32. A portion 35 extends inwardly for engagement with groove 36 of the end thrust plate 25. This threaded member 31 may be projected into said slot 36 by means of rotation of a screw driver inserted in the slot 33.

The following is a description of the operation of the brake adjustment device: A screw driver is inserted in slot 33. Upon rotation of the screw driver, the threaded member 31 advances inwardly. When the slot 36 of the end thrust plate 25 is in alignment with the inner portion 35 of threaded member 31, the threaded member may be received in slot 36. As the portion 35 of the threaded member 31 engages the end thrust plate 25 the wheel 1 may be rotated. As wheel 1 is rotated, the end thrust member 25 threadedly advances axially on the stator disk mounting member until the brake disks 15 and 16 are contacting each other. The wheel then is rotated backwards to provide the desired clearance between the brake disks 15 and 16, and the detent 26 drops into a groove 39 to provide a locking means and maintain the end thrust plate 25 in a nonrotating position in relation to the stator disk mounting member 14. The threaded member 31 then is rotated and threadedly backed outward from engagement with the end thrust member 25 to its original position.

The seal 32 provides a means of sealing all foreign material out of the brake housing 29 regardless of the position of the threaded member 31.

While the embodiments of the present invention as herein disclosed constitutes a preferred form, it is to be understood that other forms might be adopted.

What is claimed is as follows:

1. A brake-adjusting device, comprising in combination; a stator member, one or more stator disks mounted on said stator member, plate members mounted on the inboard and outboard end of said stator member, one of said plate members threadedly engaging said stator member, a rotating housing member in spaced relation to said plate members, one or more rotating disks mounted on said housing member, a sleeve mounted on said housing member with a threaded portion on its inner periphery, a threaded member mounted within said sleeve member threadedly engaging said threaded portion of said sleeve head, means on said threaded member adapted for rotating said threaded member inwardly by external means to engage said threaded plate member to provide axial advancement of said plate member on the threaded portion of said stator member upon rotation of the brake housing and thereby provide adjustment of said brake disks upon rotation of said housing.

2. A brake-adjusting device, comprising in combination; a stator member, an annular threaded thrust member threadedly engaging an end of said stator member, an annular non-threaded thrust member engaging the opposite end of said stator member, a spring detent mounted within the said threaded thrust member, one or more stator disks mounted on said stator member, one or more rotating disks for engaging said stator disks, a brake housing connected to said rotating disks, a shaft connected to said brake housing, a shaft housing mounted about said shaft connected to said stator member, a bearing assembly mounted on the outer periphery of said shaft housing, a wheel rotatably mounted on said bearing and connected to said brake housing, a rim mounted on the outer periphery of said wheel, a threaded member mounted in said brake housing for engaging said annular threaded thrust member in a locking position with the brake housing thereby providing axial movement of said annular threaded thrust member to provide brake adjustment when said rim is rotated.

3. A brake-adjusting mechanism comprising; a shaft, a shaft housing around said shaft, a bearing mounted on said shaft housing, a wheel rotatably mounted on said bearing, a brake housing connected to said wheel and said shaft, a stator member mounted on said shaft housing within said brake housing, stationary disks mounted on said stator member, rotating disks mounted on said brake housing for engagement with said stationary disks, a brake actuating pressure plate mounted adjacent said disks on said stator member for actuating said brake, a thrust plate threadedly mounted on said stator member adjacent said disks but on the opposite side of said actuating member, a screw threaded member carried in said housing, a seal mounted on said threaded member, a head means on said screw threaded member adapted for rotation by external means, a slot means in said thrust plate for receiving the inwardly extending portion of said screw threaded member in the brake adjusting position to lock said thrust plate to said brake housing and thereby provide a brake adjustment upon rotation of said wheel.

4. A brake adjusting device comprising in combination; a stator member, at least one stator brake disk mounted on said stator member, a rotating brake housing member in spaced relation to said stator member, at least one rotating brake disk mounted on said brake housing member for engagement with said stator brake disks, a shaft connected to said brake housing, a shaft housing mounted about said shaft connected to said stator member, a bearing assembly mounted on the outer periphery of said shaft housing, a wheel rotatably mounted on said bearing assembly and connected to said brake housing, a brake actuating pressure plate adjacent to said brake disks and mounted on said stator member, a thrust plate threadedly mounted on said stator member adjacent to said brake disks but on the opposite side of said brake disks from said brake actuating pressure plate, at least one slot means formed in said threaded thrust plate, a threaded portion on said stator member for threadedly engaging the inner periphery of said thrust plate and having at least one axially extending groove formed in said threaded portion of said stator member, a spring biased detent mounted within said threaded thrust plate, said detent for reception within said axial groove in said stator member to bias said threaded thrust plate and said stator member in an adjusted position, a screw member placed in said brake housing and having a portion for reception within said slot means in said threaded thrust plate, head means on said screw member adapted for rotating said screw member by external means to insert said portion of said screw member in said slot means of said threaded thrust plate and thereby provide a locking means between said brake housing and said threaded thrust plate and to provide clearance adjustment between said brake disks when said housing is rotated.

5. A brake adjusting device comprising in combination; a stator member, at least one stator brake disk mounted on stator member, a rotating brake housing in spaced relation to said stator member, at least one rotating brake disk mounted on said brake housing, a brake actuating pressure plate adjacent to and concentric with said brake disks and mounted on said stator member for frictionally engaging of said brake disks, a threaded thrust plate threadedly mounted on said stator member adjacent to and concentric with said brake disks but mounted on the opposite side of said brake disks from said brake actuating pressure plate, a shaft connected to said brake housing, a shaft housing mounted about said shaft and concentrically supporting said stator member, a bearing assembly mounted on the outer periphery of said shaft housing, a wheel rotatably mounted on said bearing assembly and connected to said brake housing, a threaded portion on the outer periphery of said stator member for threadedly engaging said threaded thrust plate and having axially extending grooves angularly spaced about the outer periphery in the threaded portion of said stator member, at least one spring biased detent mounted in said threaded thrust plate for reception within said axial grooves of said stator member to provide retardation of rotation of said threaded thrust plate relative to said stator member, slot means formed in said threaded thrust plate, a set screw mounted within the brake housing and having a seal means, head means on said set screw adapted for rotation by an external means to axially advance said set screw to engage said slot means in said threaded thrust plate to thereby lock said brake housing with said thrust plate and provide clearance adjustment between said brake disks when said brake housing is rotated.

References Cited in the file of this patent

UNITED STATES PATENTS

| | | |
|---|---|---|
| 1,791,685 | Rockwell et al. | Feb. 10, 1931 |
| 2,014,630 | O'Brien et al. | Sept. 17, 1935 |
| 2,240,312 | Minturn | Apr. 29, 1941 |
| 2,274,213 | Pratt et al. | Feb. 24, 1942 |
| 2,773,552 | Schjolin et al. | Dec. 11, 1956 |
| 2,835,357 | Kelley et al. | May 20, 1958 |